US010986520B2

(12) United States Patent
Nagaraja et al.

(10) Patent No.: US 10,986,520 B2
(45) Date of Patent: Apr. 20, 2021

(54) CONFIGURATION OF BEAM PAIR LINKS DURING RANDOM ACCESS

(71) Applicant: QUALCOMM Incorporated, San Diego, CA (US)

(72) Inventors: Sumeeth Nagaraja, San Diego, CA (US); Tao Luo, San Diego, CA (US); Muhammad Nazmul Islam, Edison, NJ (US); Makesh Pravin John Wilson, San Diego, CA (US); Sony Akkarakaran, Poway, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/021,279

(22) Filed: Jun. 28, 2018

(65) Prior Publication Data
US 2019/0021018 A1 Jan. 17, 2019

Related U.S. Application Data

(60) Provisional application No. 62/532,903, filed on Jul. 14, 2017.

(51) Int. Cl.
H04B 7/08 (2006.01)
H04W 24/10 (2009.01)
(Continued)

(52) U.S. Cl.
CPC ............ H04W 24/10 (2013.01); H04B 7/063 (2013.01); H04B 7/0695 (2013.01); H04B 7/088 (2013.01);
(Continued)

(58) Field of Classification Search
CPC ............ H04W 24/10; H04W 74/0833; H04W 74/008; H04W 72/046; H04W 74/006;
(Continued)

(56) References Cited

U.S. PATENT DOCUMENTS

2013/0121185 A1* 5/2013 Li ............... H04W 24/10 370/252
2013/0286960 A1* 10/2013 Li ............... H04W 72/042 370/329
(Continued)

FOREIGN PATENT DOCUMENTS

WO WO-2018023086 A1 2/2018
WO WO-2018031953 A1 2/2018
WO WO-2018064327 A1 4/2018

OTHER PUBLICATIONS

ZTE Microelectronics—Group based beam management for NR-MIMO: 3GPP TSG RAN WG1 Meeting #88 (R1-1701798) Athens, Greece, Feb. 13-17, 2017 (Year: 2017).*
(Continued)

Primary Examiner — Edan Orgad
Assistant Examiner — Malick A Sohrab
(74) Attorney, Agent, or Firm — Patterson + Sheridan, L.L.P.; Kevin M. Donnelly

(57) ABSTRACT

Methods and apparatus are provided for configuring beam pair links during random access. A User Equipment (UE) receives, in a first message of a Random Access Channel (RACH) procedure, a request from a Base Station (BS) to report information relating to a plurality of BS beams. The UE reports, in a second message of the RACH procedure, the information relating to one or more of the plurality of BS beams in response to the request. The UE receives configuration information including information relating to one or more beam pair links configured for communication between the UE and the BS based on the reported information.

28 Claims, 10 Drawing Sheets

(51) Int. Cl.
  *H04W 72/04* (2009.01)
  *H04L 5/00* (2006.01)
  *H04B 7/06* (2006.01)
  *H04B 17/318* (2015.01)
  *H04W 74/00* (2009.01)
  *H04W 74/08* (2009.01)
  *H04W 72/08* (2009.01)

(52) U.S. Cl.
  CPC ......... *H04B 17/318* (2015.01); *H04L 5/0053* (2013.01); *H04L 5/0092* (2013.01); *H04W 72/046* (2013.01); *H04W 74/008* (2013.01); *H04W 74/0833* (2013.01); *H04L 5/0051* (2013.01); *H04W 72/085* (2013.01); *H04W 74/006* (2013.01)

(58) Field of Classification Search
  CPC ... H04W 72/085; H04B 7/088; H04B 7/0695; H04B 7/063; H04B 17/318; H04L 5/0092; H04L 5/0053; H04L 5/0051
  See application file for complete search history.

(56) References Cited

U.S. PATENT DOCUMENTS

| | | | | |
|---|---|---|---|---|
| 2014/0177607 | A1* | 6/2014 | Li | H04W 52/42 370/336 |
| 2016/0323917 | A1* | 11/2016 | Hwang | H04W 74/0833 |
| 2017/0207843 | A1* | 7/2017 | Jung | H04B 7/0695 |
| 2017/0303264 | A1 | 10/2017 | Islam et al. | |
| 2018/0097552 | A1 | 4/2018 | Kakishima et al. | |
| 2020/0028560 | A1* | 1/2020 | Gao | H04B 7/0417 |
| 2020/0036430 | A1* | 1/2020 | Kim | H04W 24/10 |

OTHER PUBLICATIONS

International Search Report and Written Opinion—PCT/US2018/040237—ISA/EPO—dated Oct. 5, 2018.
Qualcomm Incorporated: "Measurement Reporting and Beam Refinement During Handover", 3GPP Draft; R2-1705095 Measurement Reporting and Beam Refinement During Handover, 3rd Generation Partnership Project (3GPP), Mobile Competence Centre; 650, Route Des Lucioles; F-06921 Sophia-Antipolis, vol. RAN WG2, No. Hangzhou, China; May 15, 2017-May 19, 2017, May 14, 2017 (May 14, 2017), pp. 1-4, XP051275572, Retrieved from the Internet: URL: http://www.3gpp.org/ftp/Meetings_3GPP_SYNC/RAN2/Docs/ [retrieved on May 14, 2017].
Qualcomm Incorporated: "Measurement Reporting and Beam Refinement during RACH," 3GPP Draft; R2-1706912 Beam Refinement After RACH, 3rd Generation Partnership Project (3GPP), Mobile Competence Centre; 650, Route Des Lucioles; F-06921 Sophia-Antipolis Cedex; France, vol. RAN WG2, No. Qingdao, China; Jun. 27, 2017-Jun. 29, 2017, Jun. 26, 2017, XP051301409, 8 pages, Retrieved from the Internet: URL: http://www.3gpp.org/ftp/Meetings_3GPP_SYNC/RAN2/Docs/ [retrieved on Jun. 26, 2017].
ZTE, et al., "Group Based Beam Management for NR-MIMO", 3GPP Draft; R1-1701798 Group Based Beam Management, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 7, 2017 (Feb. 7, 2017), 9 Pages, XP051220864, Retrieved from the Internet: URL: http://www.3gpp.org/ftp/tsg_ran/WG1_RL1/TSGR1_88/Docs/ [retrieved on Feb. 7, 2017].

* cited by examiner

CONFIGURATION OF BEAM PAIR LINKS DURING RANDOM ACCESS

This application claims priority to U.S. Provisional Application Ser. No. 62/532,903, entitled "CONFIGURATION OF BEAM PAIR LINKS DURING RANDOM ACCESS", filed on Jul. 14, 2017, which is expressly incorporated by reference in its entirety.

FIELD

The present disclosure relates generally to wireless communication systems, and more particularly, to methods and apparatus for configuration of beam pair links during random access.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or $5^{th}$ generation (5G) network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a User Equipment (UE). The method generally includes receiving, in a first message of a Random Access Channel (RACH) procedure, a request from a Base Station (BS) to report information relating to a plurality of BS beams, reporting, in a second message of the RACH procedure, the information relating to one or more of the plurality of BS beams in response to the request, and receiving configuration information including information relating to one or more beam pair links configured for communication between the UE and the BS based on the reported information.

Certain aspects of the present disclosure provide a method for wireless communications by a source Base Station (BS). The method generally includes transmitting, to a User Equipment (UE) in a first message of a Random Access Channel (RACH) procedure, a request to report information relating to a plurality of BS beams, receiving, from the UE in a second message of the RACH procedure, the information relating to one or more of the plurality of BS beams in response to the request, and transmitting configuration information including information relating to one or more beam pair links configured for communication between the UE and the BS, the one or more beam pair links configured based on the received information.

Certain aspects of the present disclosure provide a method for wireless communications by a User Equipment (UE). The method generally includes receiving, in a first message of a Random Access Channel (RACH) procedure, a request from a Base Station (BS) to report information relating to a plurality of BS beams, wherein the first message further includes configuration information including a configuration for establishing one or more beam pair links for communication between the UE and the BS, reporting, in a second message of the RACH procedure, the information relating to one or more of the plurality of BS beams in response to the request, and using one or more of the reported BS beams for communication between the UE and the BS based on the received configuration information.

Certain aspects of the present disclosure provide a method for wireless communications by a source Base Station (BS). The method generally includes transmitting, in a first message of a Random Access Channel (RACH) procedure, a request from a Base Station (BS) to report information relating to a plurality of BS beams, wherein the first message further includes configuration information including a configuration for establishing one or more beam pair links for communication between the UE and the BS, receiving, in a second message of the RACH procedure, information relating to reported one or more of the plurality of BS beams in response to the request, and using one or more of the reported BS beams for communication between the UE and the BS based on the transmitted configuration information.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
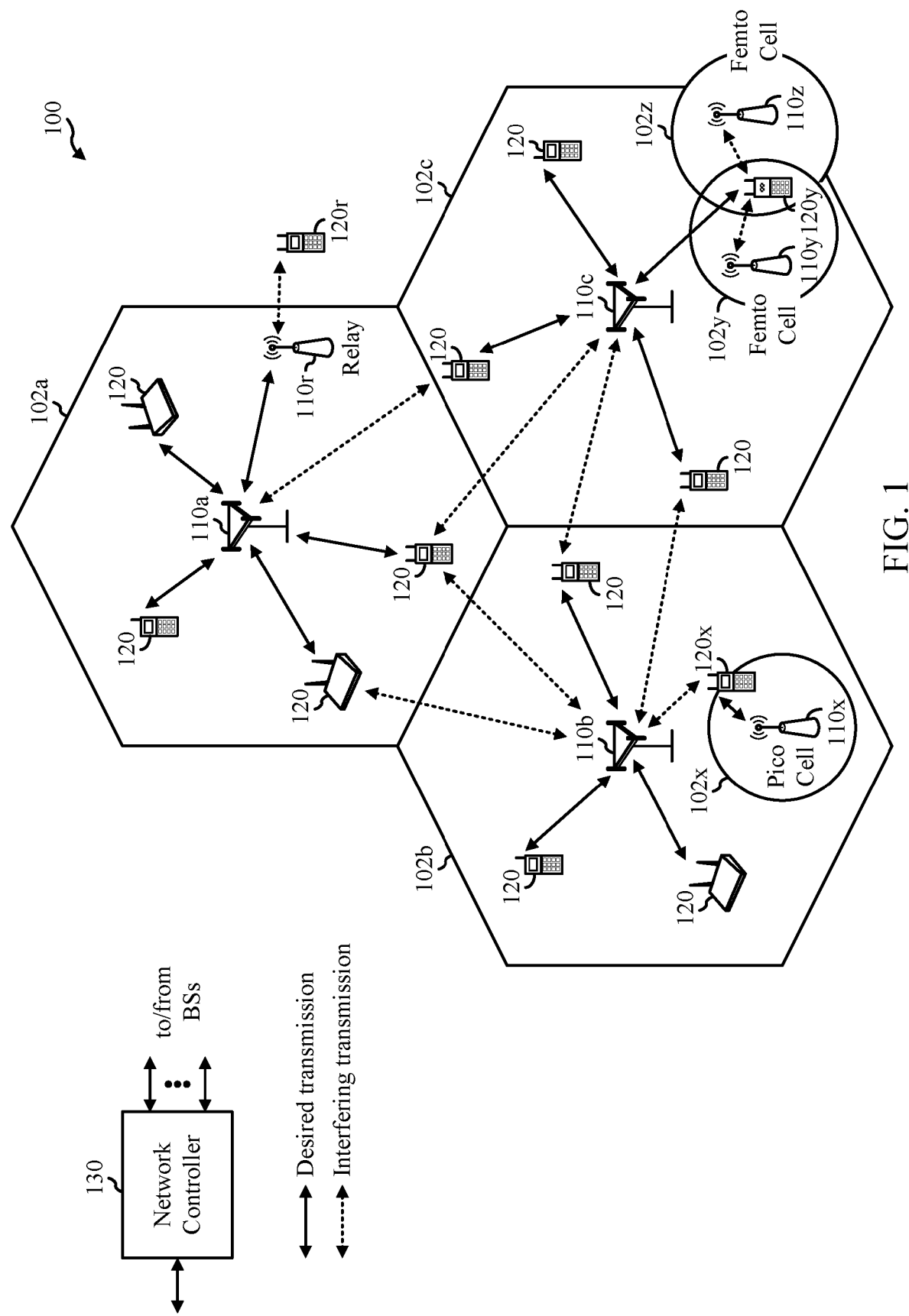
FIG. 1 is a block diagram conceptually illustrating an example telecommunications system, in accordance with certain aspects of the present disclosure.

For initial cell acquisition, a UE generally listens to broadcasted signals, for example, including Primary Synchronization Signal (PSS), Secondary Synchronization Signal (SSS), Extended Synchronization Signal (ESS), Demodulation Reference Signal (e.g., for PBCH) and Physical Broadcast Channel (PBCH). The broadcasted signals are generally carried over directional beams. The UE, based on the synchronization signals and other reference signals transmitted by a Node B, selects a cell and beam within the cell. After camping on the cell, the UE receives and decodes system information including parameters for performing a Random Access Channel (RACH) procedure. The UE then performs a RACH procedure (e.g., contention based RACH procedure) on the selected cell using the beam pair determined based on the received synchronization signals.

One limitation of the RACH procedure is that due to user mobility, rotation or signal blockage, beam characteristics change over time. This may cause beam failure, which in turn may result in retransmissions and/or RACH failure. Thus, a beam pair link (e.g., including a BS Tx-Rx beam and a UE Tx-Rx beam) selected by the UE for initial access (e.g., based on synchronization signals) may not be optimal.

Certain aspects of the present disclosure discuss techniques to configure one or more alternative beam pair links between a Node B and a UE for exchange of control and/or data to enhance reliability. In certain aspects, the UE may report information regarding a plurality of base station (BS) beams during initial access and the BS, based on the reported information, may configure one or more beam pair links for communication between the BS and the UE. In certain aspects, this technique provides the UE with alternative beam pair links for use with the BS, and makes control and data exchange between the UE and the BS more reliable.

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

EXAMPLE WIRELESS COMMUNICATIONS SYSTEM

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth (e.g., system frequency band) into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
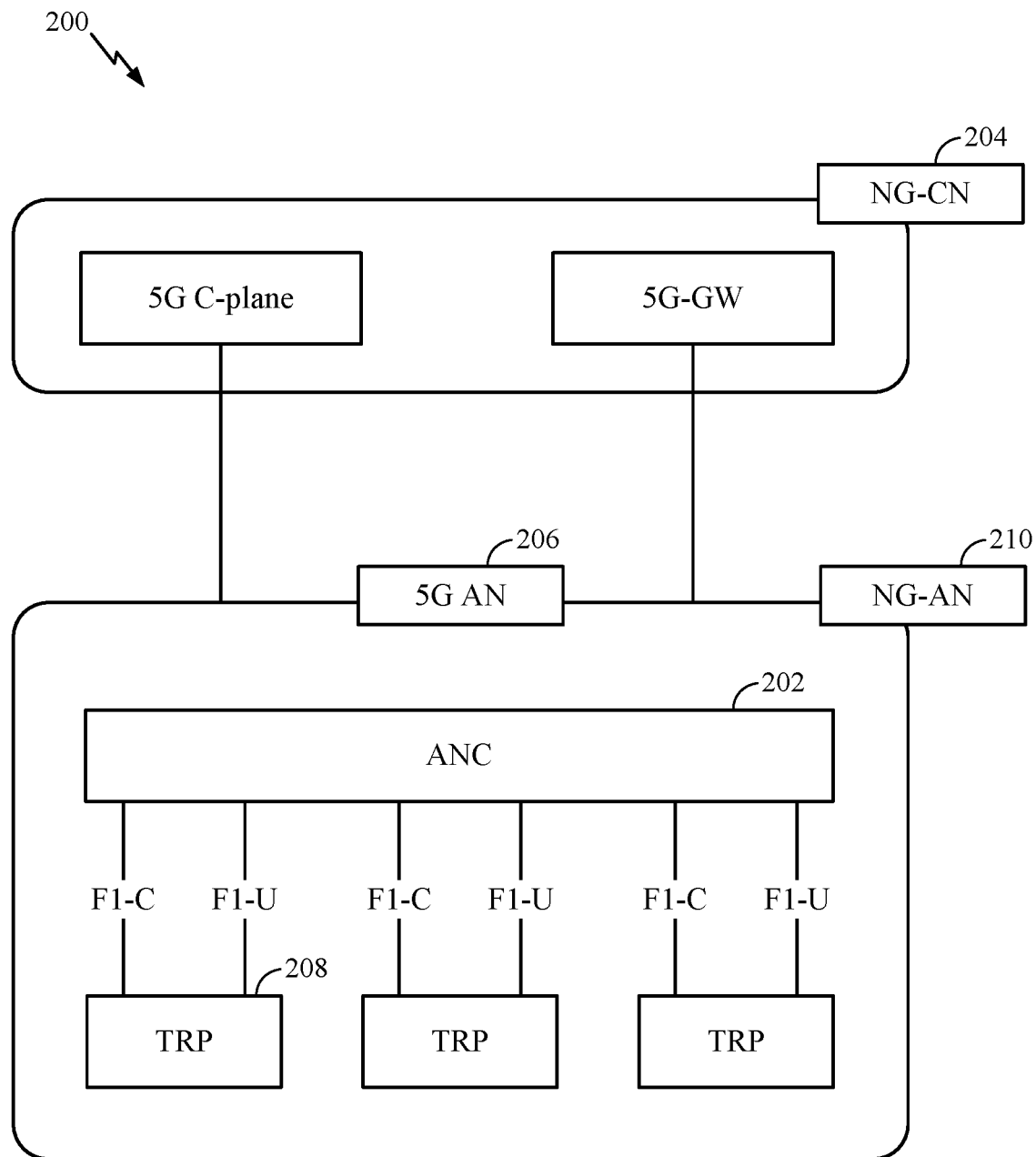
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
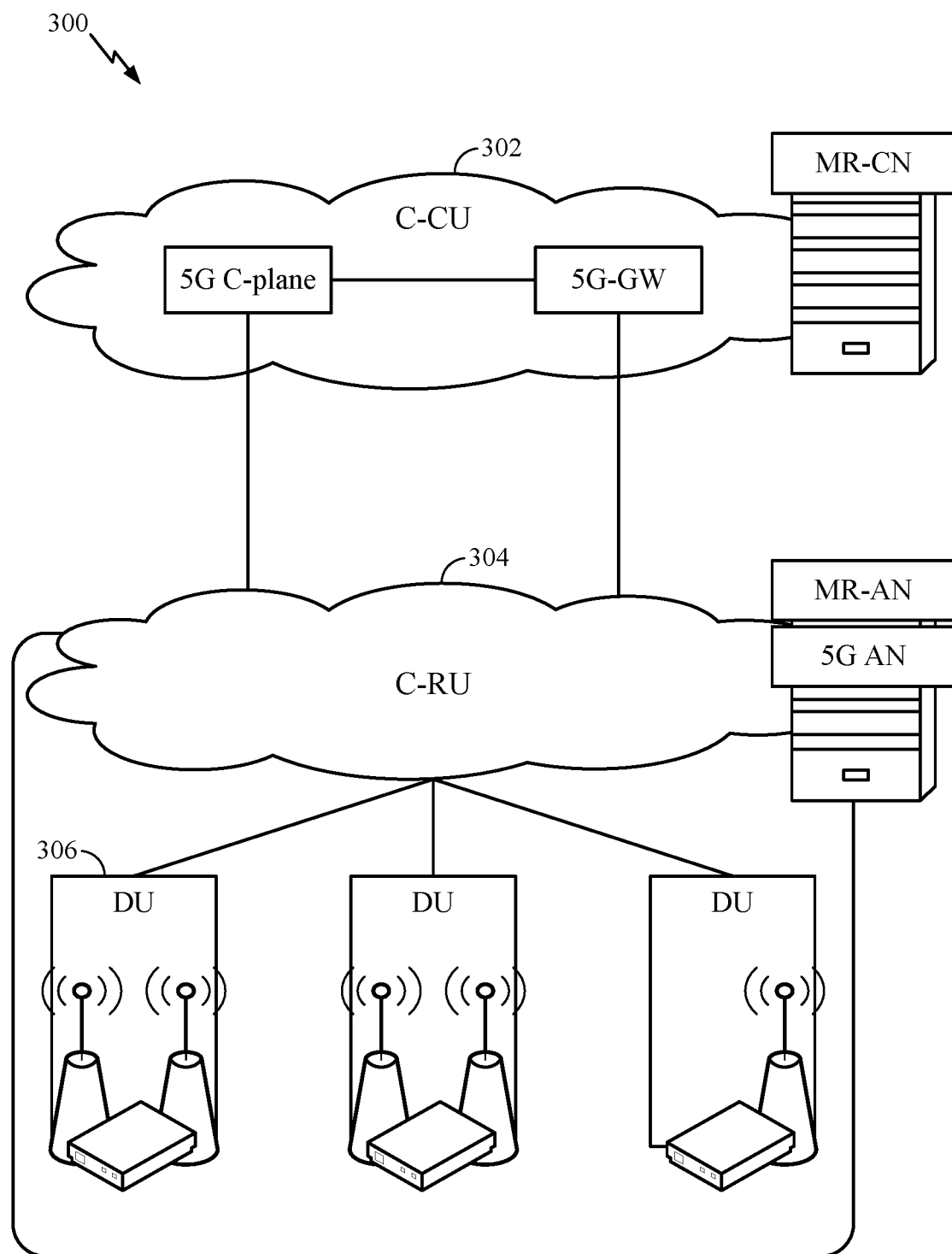
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
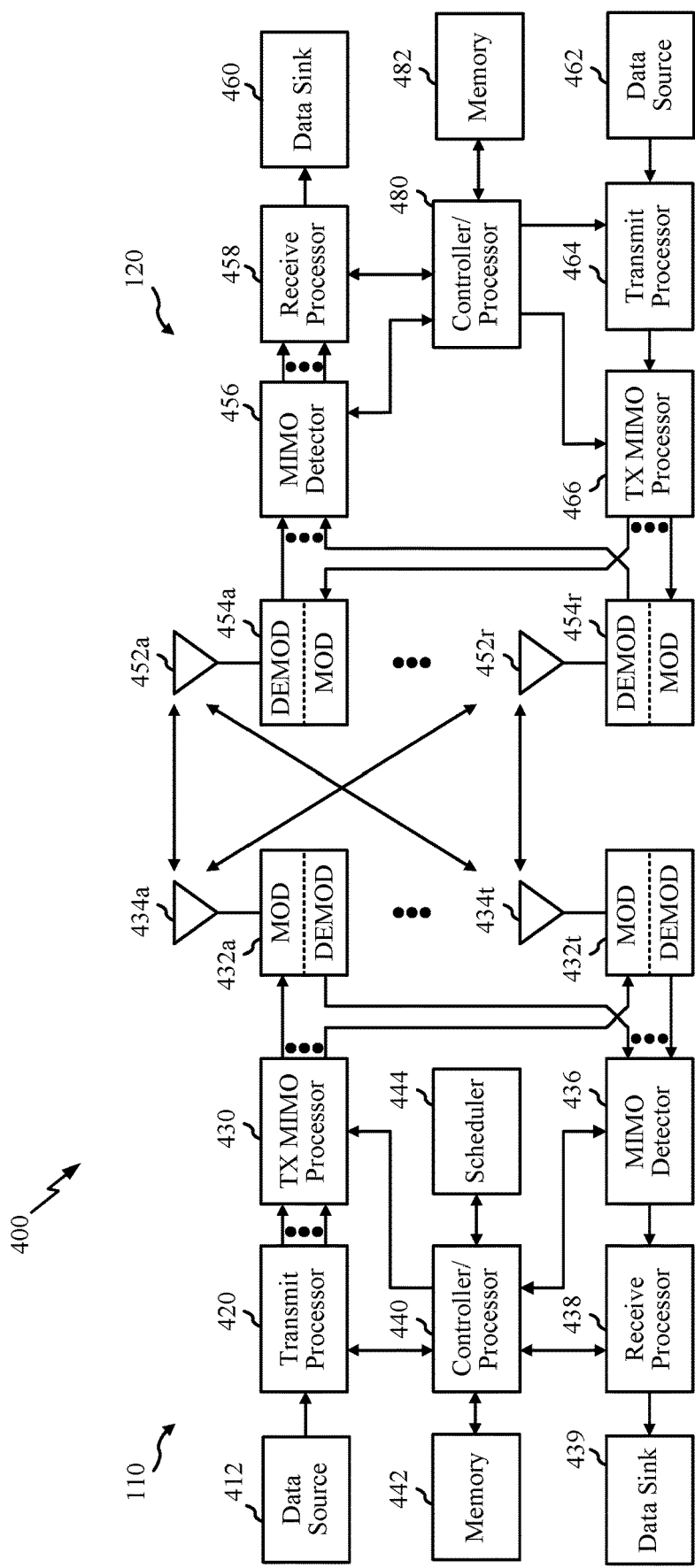
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 8-9.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 10, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
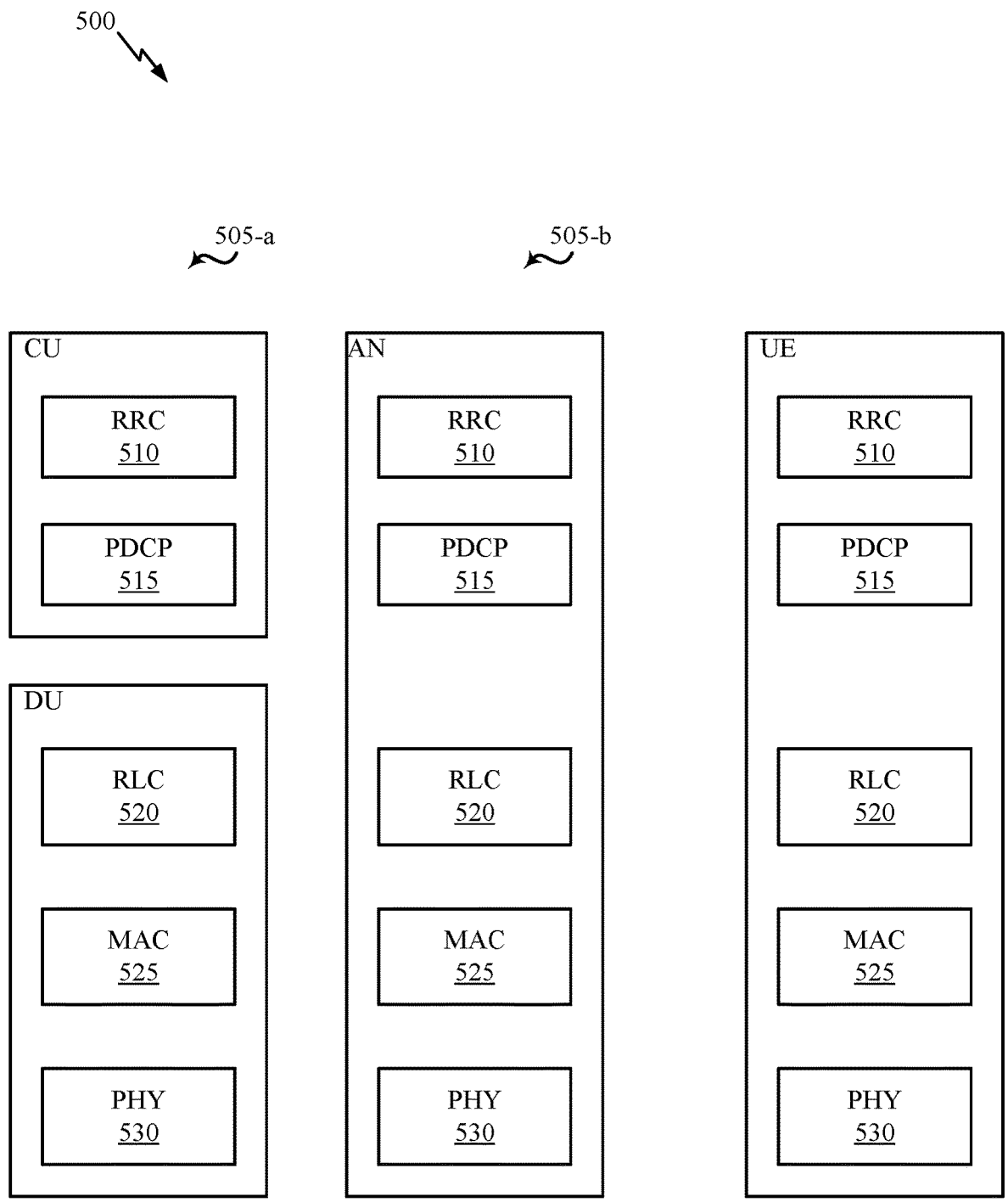
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
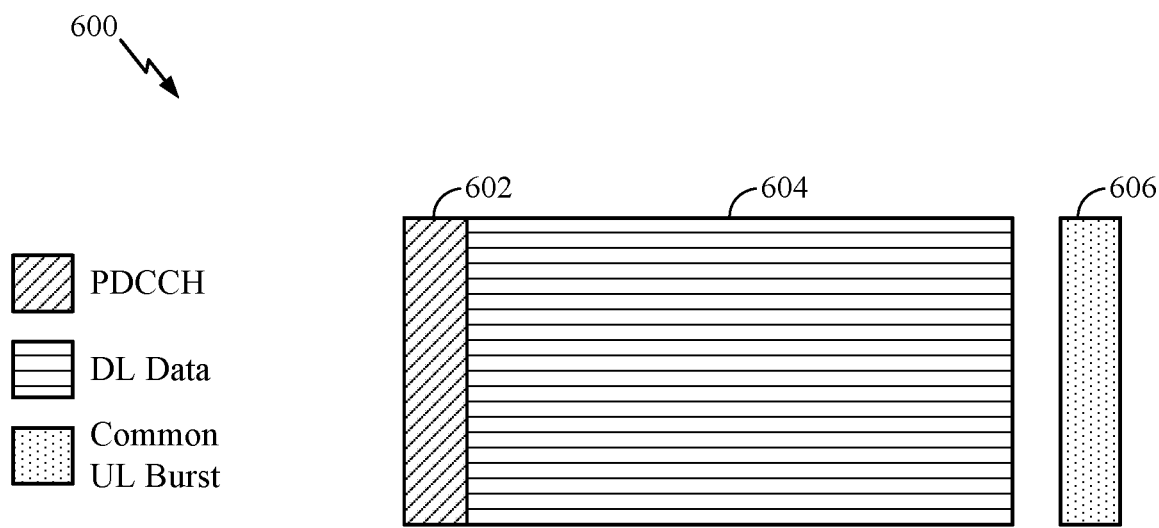
FIG. 6 illustrates an example of a downlink-centric (DL-centric) subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
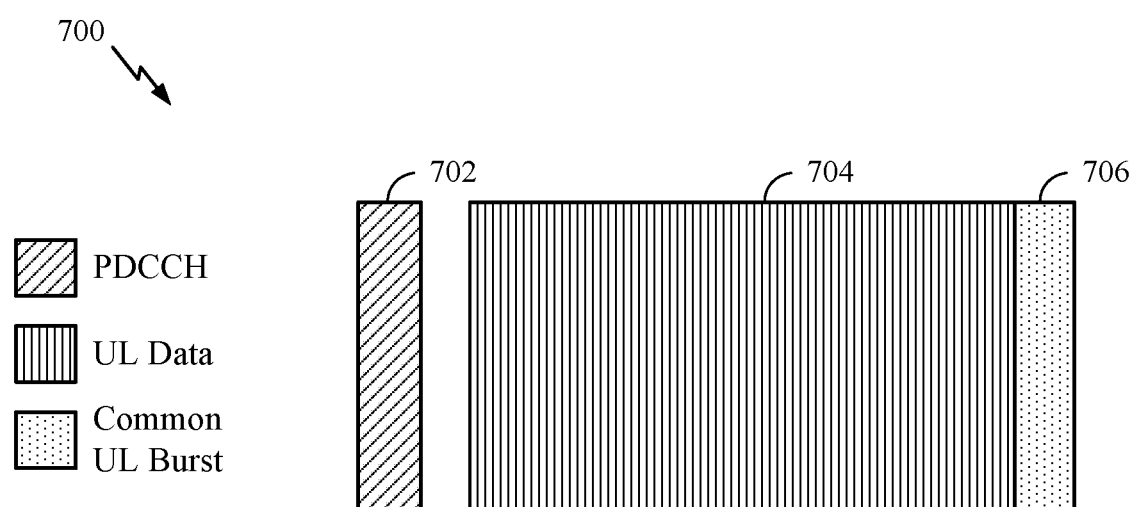
FIG. 7 illustrates an example of an uplink-centric (UL-centric) subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL data portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

EXAMPLE CONFIGURATION OF BEAM PAIR LINKS DURING RANDOM ACCESS

For initial cell acquisition, a UE generally listens to broadcasted signals, for example, including Primary Synchronization Signal (PSS), Secondary Synchronization Signal (SSS), Extended Synchronization Signal (ESS), Demodulation Reference Signal (e.g., DMRS for PBCH) and Physical Broadcast Channel (PBCH). The broadcasted signals are generally carried over directional beams. The UE, based on the synchronization signals and other reference signals transmitted by a Node B, selects a cell and beam within the cell. After camping on the cell, the UE receives and decodes system information including parameters for performing a Random Access Channel (RACH) procedure. The UE then performs a RACH procedure (e.g., contention based RACH procedure) on the selected cell using a beam pair determined based on the received synchronization signals.

A typical RACH procedure (e.g., similar to LTE RACH procedure) may include the UE transmitting a message 1 including a RACH preamble to the Node B. For transmission of message 1, the UE selects a preamble sequence (e.g., based on system information). The UE also selects a resource (e.g., a symbol index, for example, a RACH opportunity in subframe m), a frequency band within a system bandwidth, and calculates transmit power for the transmission of message 1. In an aspect, the UE uses the same antenna subarray and beam for the transmission of message 1 that was used when samples of the beam were detected and selected when receiving synchronization signals.

At the network, the Node B monitors a corresponding receive (Rx) beam for the preamble sequence and receives the preamble sequence. After receiving the preamble sequence in message 1, the Node B transmits a PDCCH with an associated Randol Access Radio Network Temporary Identifier (RA-RNTI) to the UE. The Node B also transmits a corresponding PDSCH that includes message 2 of the RACH procedure. This constitutes a Random Access Response. Generally, at the Node B it is assumed that the PDCCH and the PDSCH use the same transmit (Tx) beam/port that was used to receive message 1.

For message 2 reception, the UE may use the same antenna subarray and beam that was used for message1 transmission or with some refinement. In an aspect, UE monitors PDCCH for message 2 identified by the RA-RNTI in the RA Response window (RAR window) that starts at the subframe (SF) that includes the end of the preamble transmission+N SF (e.g, N is an integer), and has a length of ra-ResponseWindowSize which is generally represented as a number of subframes. In an aspect, the parameter ra-ResponseWiSSndowSize is broadcast in SIB 2.

Following message 2, UE and Node B exchange messages 3 and 4 to complete the RACH procedure.

One limitation of the RACH procedure is that due to user mobility, rotation or signal blockage, beam characteristics change over time. This may cause beam failure, which in turn may result in retransmissions and/or RACH failure. Thus, a beam pair link (e.g., including a BS Tx-Rx beam and a UE Tx-Rx beam) selected by the UE for initial access (e.g., based on synchronization signals) may not be optimal.

Certain aspects of the present disclosure discuss techniques to configure one or more alternative beam pair links between a Node B and a UE for exchange of control and/or data (e.g., PDCCH, PDSCH, PUCCH, PUSCH) to enhance reliability. In certain aspects, the UE may report information regarding a plurality of base station (BS) beams during initial access and the BS, based on the reported information, may configure one or more beam pair links for communication between the BS and the UE. In certain aspects, this technique provides the UE with alternative beam pair links for use with the BS, and makes control and data exchange between the UE and the BS more reliable.

In certain aspects, a BS may request a UE, during a RACH procedure, to report information regarding a plurality of BS beams. The UE may report one or more BS beams in response to the network request. The network may configure one or more beam pair links for communication between the UE and the BS based on the UE reports. Once configured, the one or more configured beam pair links may be used by the BS and the UE to exchange control and data messages.

Figure 8:
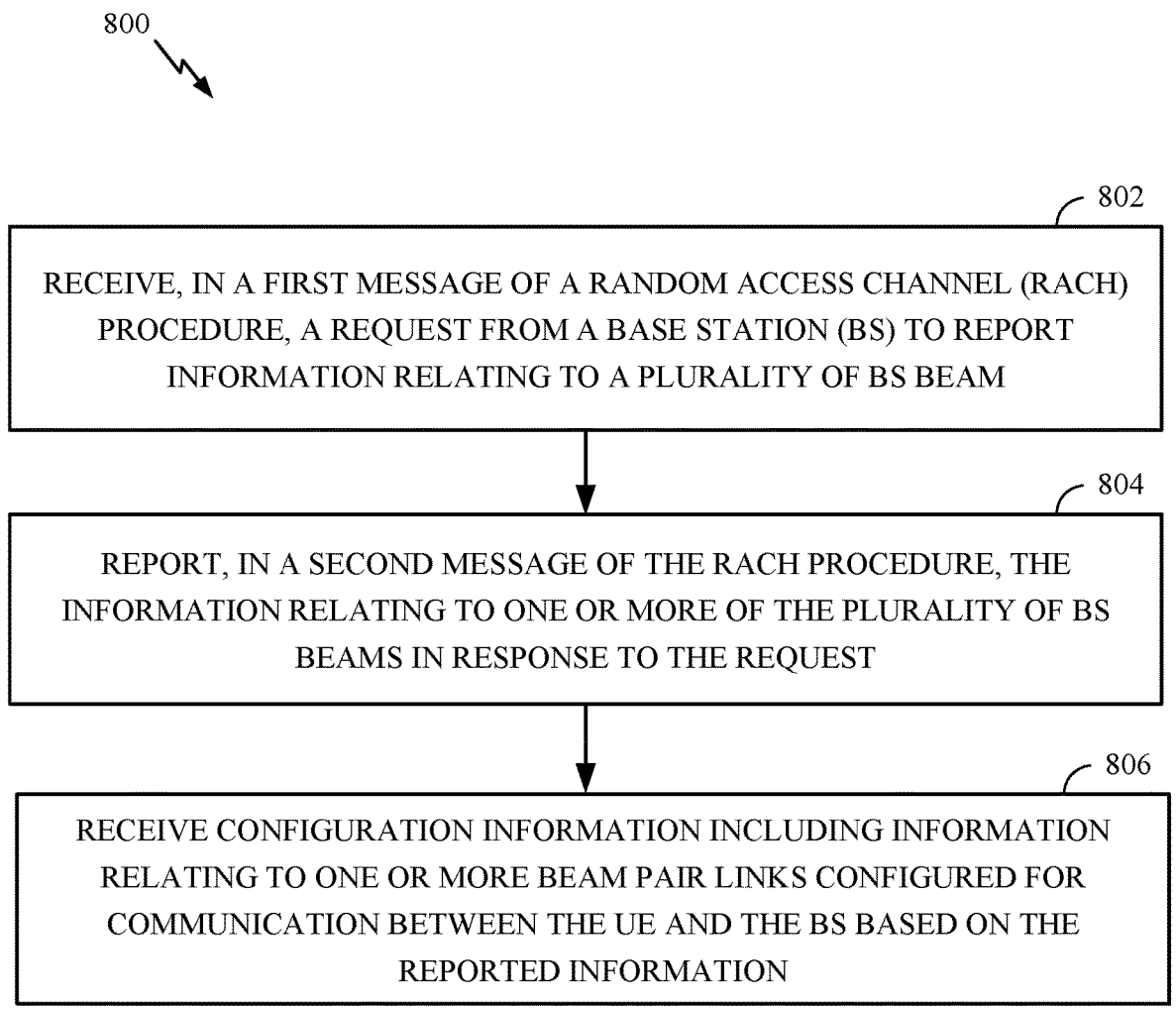
FIG. 8 illustrates example operations 800 that may be performed by a UE for configuration of one or more beam pair links, in accordance with certain aspects of the present disclosure.

FIG. 8 illustrates example operations 800 that may be performed by a UE for configuration of one or more beam pair links, in accordance with certain aspects of the present disclosure.

Operations 800 begin, at 802, by receiving, in a first message of a RACH procedure, a request from a BS to report information relating to a plurality of BS beams. At 802, the UE reports, in a second message of the RACH procedure, the information relating to one or more of the plurality of BS beams in response to the request. At 806, the UE receives configuration information including information relating to one or more beam pair links configured for communication between the UE and the BS based on the reported information.

Figure 9:
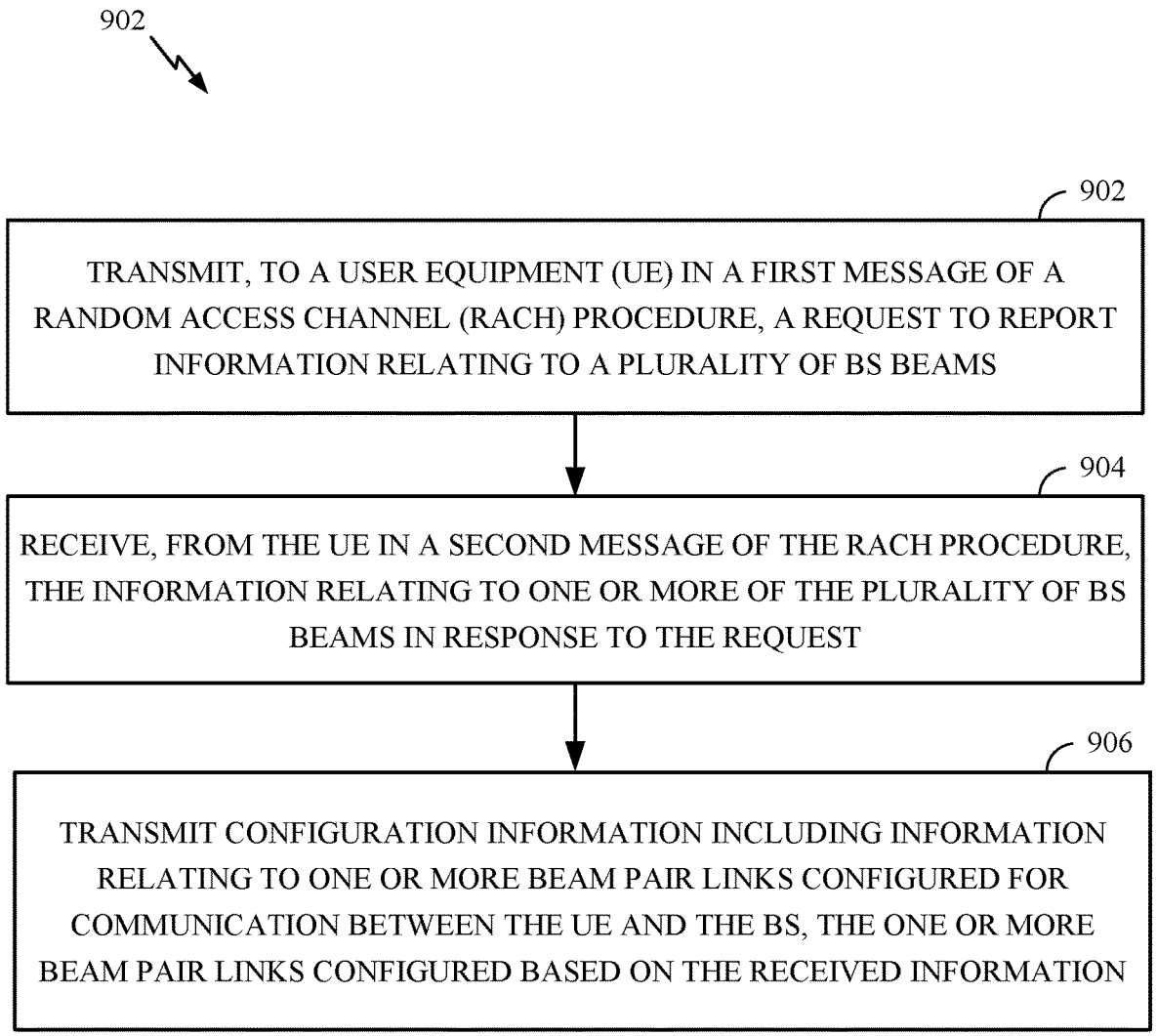
FIG. 9 illustrates example operations 900 that may be performed by a BS (e.g., a gNB) for configuration of one or more beam pair links, in accordance with certain aspects of the present disclosure.

FIG. 9 illustrates example operations 900 that may be performed by a BS (e.g., a gNB) for configuration of one or more beam pair links, in accordance with certain aspects of the present disclosure.

Operations 900 begin, at 902, by transmitting, to a UE in a first message of a RACH procedure, a request to report information relating to a plurality of BS beams. At 904, the BS receives, from the UE in a second message of the RACH procedure, the information relating to one or more of the plurality of BS beams in response to the request. At 906, the BS transmits configuration information including information relating to one or more beam pair links configured for communication between the UE and the BS, the one or more beam pair links configured based on the received information.

In an aspect, the first message and second message in operations 800 and 900 correspond to message 2 and message 3 respectively of a typical RACH procedure.

In certain aspects, the BS may include the request for reporting information relating to the plurality of BS beams in message 2 of the RACH procedure. In an aspect, this request may be based on BS uplink measurements of the PRACH (Physical Random Access Channel). In response to the request, the UE may report information regarding one or more BS beams, as received at the UE, in message 3 of the RACH procedure. In an aspect, the BS may request the UE to report up to N BS beams and the UE may report M BS beams, wherein M<=N. For example, the BS may request the UE to report the top N BS beams (e.g., based on the transmit powers of the BS beams). However, the UE may report only a subset (e.g., M BS beams) as seen by the UE. In an aspect, for contention based RACH procedure, the BS may not include the identity of particular BS beams to be measured by the UE. Instead, the UE decides which BS beams to report, for example, based on received signal strengths of the received BS beams.

In certain aspects, the information regarding the one or more BS beams reported by the UE may include a beam ID of each reported BS beam and a corresponding signal strength of the beam as measured by the UE.

In certain aspects, the UE may report beam group sets, each beam group set including one or more BS beams as measured by an antenna subarray at the UE. The UE may use a certain antenna subarray to measure multiple BS beams. The UE may report measurements of multiple BS beams as measured by the particular antenna subarray. For example, the UE may form two beam groups, beam group 0 and beam group 1 in two different directions using two different antenna subarrays. The UE may measure four BS beams in beam group 0 direction and 5 BS beams in beam group 1 direction using the respective antenna subarrays. The UE may report the four BS beams as beam group 0 and the five BS beams as beam group 1. The UE may use the same antenna subarray/beam for each of the BS beams in a beam group.

In an aspect, the reporting by the UE of the information relating to one or more BS beams may be based on a service type, a quality of service, or other metric, for example, including a mobility state of the UE (e.g., high speed) of the UE.

In certain aspects, the BS, based on the information received from the UE (e.g., measurements relating to the BS beams), may configure one or more beam pair links to be used for exchanging control and data signals between the UE and the BS. In an aspect, the BS may transmit the configuration information relating to the beam pair links in message 4 of the RACH procedure, or anytime after receiving message 3 from the UE. In an aspect, the configured beam pair links may be used for PDCCH, PDSCH, PUCCH and PUSCH. In an aspect, in addition to the measurements of the reported BS beams, the UE may also include in message 3 information regarding the service type, quality of service and/or mobility status of the UE. The BS may take this additional information into consideration when deciding which beam pair link(s) to configure for communication between the UE and the BS.

In certain aspects, the information relating to configuration of the one or more beam pair links transmitted to the UE may include an identity of each configured BS beam. In an aspect, the UE knows the identity of each BS beam it reported and the UE beam/antenna subarray it used for receiving the BS beam. Thus, in an aspect, the UE may determine which UE beam corresponds to a BS beam configured by the BS and may use the UE beam in combination with the configured BS beam as a beam pair link for exchanging control and data signals with the BS.

In certain aspects, if the BS configures a BS beam from a BS beam group reported by the UE, the UE knows which antenna subarray/beam group the configured BS beam corresponds to, and may use the antenna subarray with the configured BS beam for communication with the BS. In an aspect, the configuration information from the BS may include an identification of the UE beam group that corresponds to a configured BS.

In certain aspects, the configuration information relating to the configured beam pair links transmitted by the BS may include information regarding the time resource(s) over which each configured beam pair link is to be used for communication between the BS and the UE. For example, the network may schedule control or data using one of the configured beam pair links (e.g., using a corresponding beam ID) in slot N+K (where N and K are integers). In another example, in case of scheduling BS beams from reported beam groups, the network may tell the UE that in slot N+K it is going to schedule control or data using one of the BS beams (e.g., using beam ID) for UE beam group 0. For example, configuration information may include scheduling of BS beam 1 of UE beam group 0 of the measurement report in slot N+K1, and scheduling of BS beam 3 of UE beam group 1 in slot N+K2 (e.g., in TDM fashion). Or for FDM fashion, in slot N+K scheduling FDMed BS beams 1 and 3 of UE beam groups 0 and 1 respectively. The UE may use the configured beam pair links in the scheduled slots to transmit/receive control and/or data signals.

In certain aspects, message 4 of the RACH procedure transmitted by the BS may further include further configuration information including transmission configuration to be used for exchanging control and/or data subsequent to configuration of the beam pair link(s). Additionally or alternatively, the transmission configuration may be carried by message 2 of the RACH procedure and/or broadcasted in a broadcast channel like PBCH or included in SIB, or on-demand SIB requested by the UE. In an aspect, the transmission configuration may be used for message 4 of the RACH procedure and any subsequent messages.

In certain aspects, the transmission configuration includes start and end times of at least one of PDCCH or PDSCH, for example, as a fraction of a nominal subframe including slots/minislots.

In certain aspects, the transmission configuration includes start and end times of at least one of PUCCH or PUSCH, for example, as a fraction of a nominal subframe including slots/minislots.

In certain aspects, the transmission configuration may include resource pattern for usage of different beam pair links. For example, the transmission configuration may include a TDM pattern specifying that a first beam pair link is to be used in slot N+K1 and a second beam pair link is to be used in slot N+K2, without actually specifying the actual beam identities to be used in the slots. The BS and UE may assign particular beam pair links for the TDM pattern based on beam pair links configured by the BS using UE measurements.

In certain aspects, the transmission configuration may include information regarding location of control channel transmission the UE needs to monitor to decode PDSCH, or transmit PUSCH during access procedure in a nominal subframe.

In certain aspects, the transmission configuration includes a start time and an end time of uplink control information when carried in PUCCH.

In certain aspects, the transmission configuration may include numerology used for PDSCH and PUSCH. For example, the transmission configuration may include a sub carrier spacing to be used for at least one of PDSCH or PUSCH.

In certain aspects, the transmission configuration may include a reference numerology used to define a nominal subframe duration. For example, a reference numerology may include 60 KHz tone spacing and 14 symbols in 500 µs.

In certain aspects, the techniques discussed above may be used for contention based random access, contention free random access, initial access and handover scenarios. For example, in contention free random access, instead of using message 3 and message 4, PUCCH/PUSCH and PDCCH/PDSCH may be used.

In certain aspects, the network may transmit (e.g., in message 2 of RACH procedure or SI) a configuration for establishing one or more beam pair links for communication between the UE and the BS. For example, the network informs the UE (in message 2 or SI) that it intends to configure two beam pair links. The UE may report one or more BS beams. If the UE reports one BS beam the network uses the reported beam for configuring one beam pair link and uses the configured beam pair link for message 4 and onwards. If the UE reports two BS beams, the BS configures two beam pair links using the two reported beams. If, the UE reports more than two BS beams, the network uses the top two beams (e.g., having highest signal strength) for configuring the two beam pair links (e.g., top reported beam as beam pair link 1 and second highest as beam pair link 2). The UE knows from message 2 or SI how many beam pair links the network intends to configure, and based on its reported BS beams knows which beams to use for communication with the BS. For example, there is an implicit mapping between the top reported BS beam (e.g., having highest signal strength) to beam pair link 1 and second highest BS beam (e.g., having second highest signal strength) to beam pair link 2. Thus, both BS and UE know which BS beams map to which configured beam pair links and communicate accordingly. In this case, there is no need for the network to explicitly inform the UE of the beam pair links configured for communication between the UE and the BS.

In certain aspects, the message 2 of the RACH procedure, in addition to the request to measure and report BS beams, may include a configuration for establishing one or more beam pair links for communication between the UE and the BS.

Figure 10:
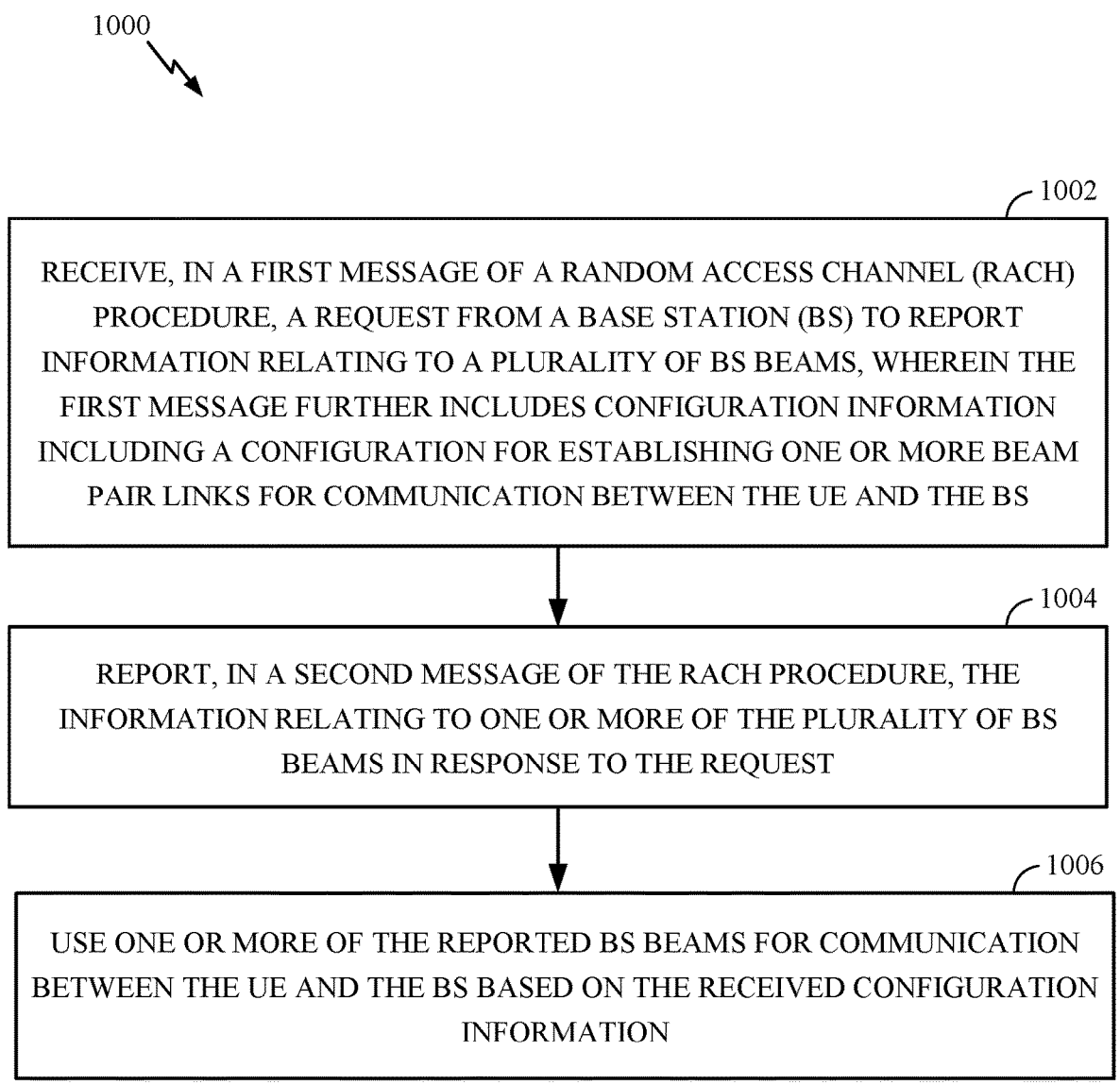
FIG. 10 illustrates example operations 1000 performed by a UE for configuration of one or more beam pair links, in accordance with certain aspects of the present disclosure.

FIG. 10 illustrates example operations 1000 performed by a UE for configuration of one or more beam pair links, in accordance with certain aspects of the present disclosure.

Operations 1000 begin, at 1002, by receiving, in a first message of a RACH procedure, a request from a Base Station (BS) to report information relating to a plurality of BS beams, wherein the first message further includes configuration information including a configuration for establishing one or more beam pair links for communication between the UE and the BS. For example, the configuration information includes a number of beam pair links the network intends to establish for communication between the UE and the BS. At 1004, the UE reports, in a second message of the RACH procedure, the information relating to one or more of the plurality of BS beams in response to the request. At 1006, the UE uses one or more of the reported BS beams for communication between the UE and the BS based on the received configuration information.

Figure 11:
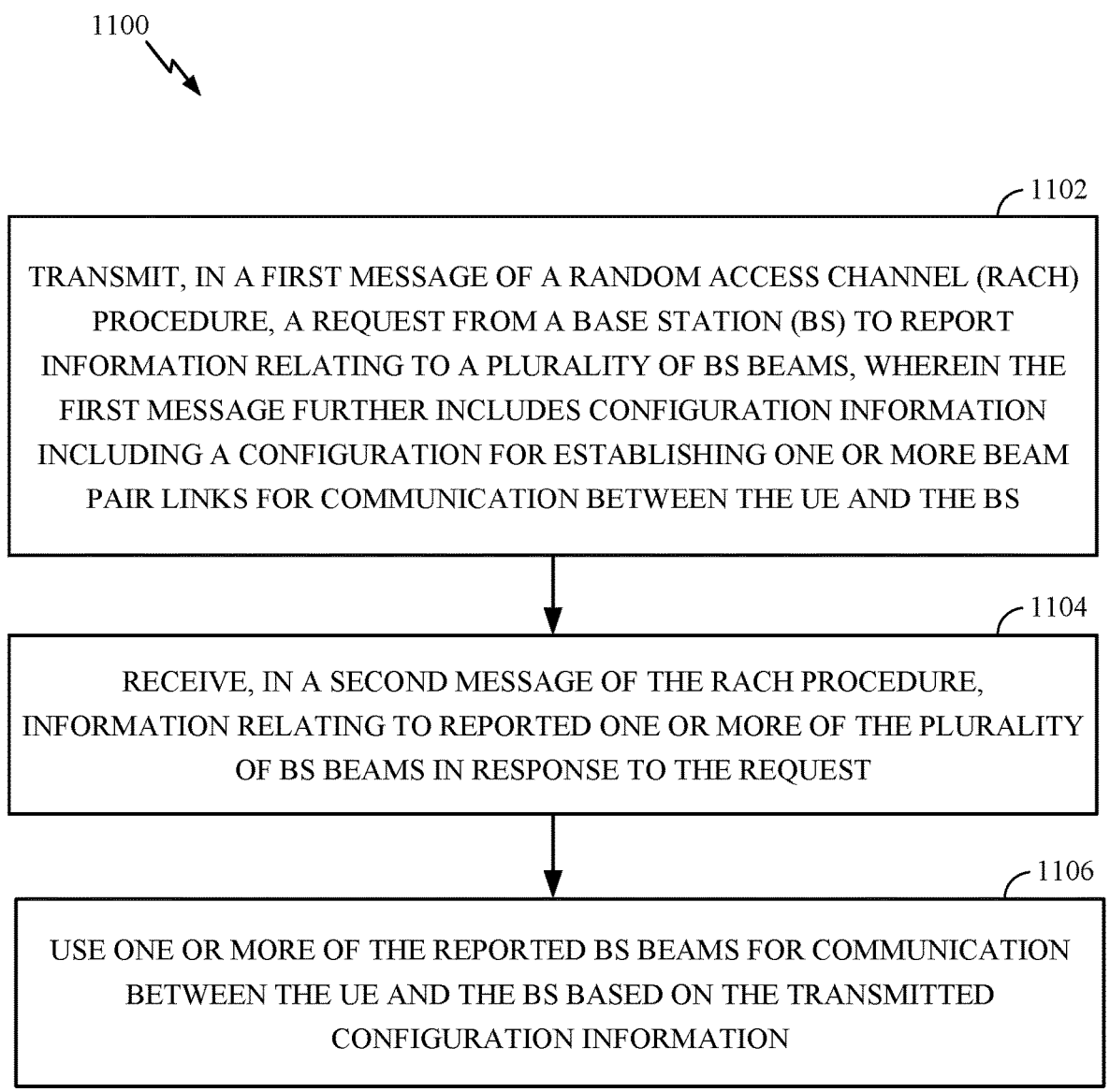
FIG. 11 illustrates example operations 1100 performed by a BS (e.g., gNB) for configuration of one or more beam pair links, in accordance with certain aspects of the present disclosure.

FIG. 11 illustrates example operations 1100 performed by a BS (e.g., gNB) for configuration of one or more beam pair links, in accordance with certain aspects of the present disclosure.

Operations 1100 being, at 1102 by transmitting, in a first message of a RACH procedure, a request from a Base Station (BS) to report information relating to a plurality of BS beams, wherein the first message further includes configuration information including a configuration for establishing one or more beam pair links for communication between the UE and the BS. At 1104, the BS receives, in a second message of the RACH procedure, information relating to reported one or more of the plurality of BS beams in response to the request. At 1106, the BS uses one or more of the reported BS beams for communication between the UE and the BS based on the transmitted configuration information.

In an aspect, the first message and the second message in operations 1000 and 1100 correspond to message 2 and message 3 respectively of a typical RACH procedure.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
    receiving, in a first message during a random access channel (RACH) procedure, a request from a base station (BS) to report information relating to a plurality of BS beams;
    reporting, in a second message during the RACH procedure in response to the request, the information relating to the plurality of BS beams, the information including an identification of a beam group of a plurality of beam groups, each beam group including a number of beams of the plurality of BS beams, each of the plurality of beam groups being associated with a different respective antenna subarray at the UE; and
    receiving, in a third message during the RACH procedure, configuration information including information relating to one or more beam pair links configured for communication between the UE and the BS based on the reported information, wherein the configuration information comprises an identification of the at least one beam group reported by the UE.

2. The method of claim 1, wherein the information relating to the plurality of BS beams includes an identification of each reported BS beam and a corresponding signal strength of the BS beam as measured by the UE.

3. The method of claim 1, wherein the information relating to the plurality of BS beams is based on at least one of a service type, a quality of service, or a mobility state of the UE.

4. The method of claim 3, wherein the information relating to the plurality BS beams includes information relating to at least one of the service type, the quality of service, or the mobility state of the UE.

5. The method of claim 1, wherein the configuration information relating to each of the beam pair links at least includes information regarding an identification of a BS beam to be used for the communication between the UE and the BS.

6. The method of claim 1, wherein the configuration information for each beam pair link includes an indication of a time resource during which the beam pair link is to be used for the communication between the UE and the BS.

7. The method of claim 1, further comprising using the configured one or more beam pair links to receive at least one of a physical downlink control channel (PDCCH), a physical downlink shared channel (PDSCH), or other reference signals.

8. The method of claim 1, further comprising using the configured one or more beam pair links to transmit at least one of a physical uplink control channel (PUCCH) or a physical uplink data channel (PUSCH).

9. The method of claim 1, wherein the first message includes message 2 of the RACH procedure, the second message includes message 3 of the RACH procedure.

10. A method for wireless communication by a base station (BS), comprising:
    transmitting, to a user equipment (UE) in a first message during a random access channel (RACH) procedure, a request to report information relating to a plurality of BS beams;
    receiving, from the UE in a second message during the RACH procedure in response to the request, the information relating to the plurality of BS beams, the information including an identification of a beam group of a plurality of beam groups, each beam group including a number of beams of the plurality of BS beams, each of the plurality of beam groups being associated with a different respective antenna subarray at the UE; and
    transmitting, in a third message during the RACH procedure in response to receiving the information, configuration information including information relating to one or more beam pair links configured for communication between the UE and the BS, the one or more beam pair links configured based on the received information, wherein the configuration information comprises an identification of the at least one beam group reported by the UE.

11. The method of claim 10, wherein the information relating to the plurality of BS beams includes an identification of each reported BS beam and a corresponding signal strength of the BS beam as measured by the UE.

12. The method of claim 10, wherein the information relating to the plurality of BS beams is based on at least one of a service type, a quality of service, or a mobility state of the UE.

13. The method of claim 12, wherein the information relating to the plurality of BS beams includes information relating to at least one of the service type, the quality of service, or the mobility state of the UE.

14. The method of claim 10, wherein the configuration information relating to each of the beam pair links at least includes information regarding an identification of a BS beam to be used for the communication between the UE and the BS.

15. The method of claim 10, wherein the configuration information for each beam pair link includes an indication of a time resource during which the beam pair link is to be used for the communication between the UE and the BS.

16. The method of claim 10, further comprising using the configured one or more beam pair links to transmit at least one of a physical downlink control channel (PDCCH), a physical downlink shared channel (PDSCH), or other reference signals.

17. The method of claim 10, further comprising using the configured one or more beam pair links to receive at least one of a physical uplink control channel (PUCCH) or a physical uplink data channel (PUSCH).

18. The method of claim 10, wherein the first message includes message 2 of the RACH procedure, the second message includes message 3 of the RACH procedure.

19. A method for wireless communication by a user equipment (UE), comprising:
receiving, in a first message during a random access channel (RACH) procedure, a request from a base station (BS) to report information relating to a plurality of BS beams, wherein the first message further includes configuration information including a configuration for establishing one or more beam pair links for communication between the UE and the BS;
reporting, in a second message during the RACH procedure after receiving the first message, the information relating to one or more of the plurality of BS beams in response to the request; and
using one or more of the reported BS beams for communication between the UE and the BS based on the configuration information received in the first message.

20. The method of claim 19, wherein the information relating to the one or more BS beams includes an identification of each reported BS beam and/or a corresponding signal strength of the BS beam as measured by the UE.

21. The method of claim 19, wherein the information relating to the one or more BS beams is based on at least one of a service type, a quality of service, or a mobility state of the UE.

22. The method of claim 19, wherein communication between the UE and the BS receiving at least one of a physical downlink control channel (PDCCH), a physical downlink shared channel (PDSCH), or other reference signals.

23. The method of claim 19, wherein communication between the UE and the BS includes transmitting at least one of a physical uplink control channel (PUCCH) or a physical uplink shared channel (PUSCH).

24. A method for wireless communication by a base station (BS), comprising:
transmitting, to a user equipment (UE) in a first message during a random access channel (RACH) procedure, a request to report information relating to a plurality of BS beams, wherein the first message further includes configuration information including a configuration for establishing one or more beam pair links for communication between the UE and the BS;
receiving, in a second message of the RACH procedure after transmitting the first message, information relating to reported one or more of the plurality of BS beams in response to the request; and
using one or more of the reported BS beams for communication between the UE and the BS based on the configuration information transmitted in the first message.

25. The method of claim 24, wherein the information relating to the one or more BS beams includes an identification of each reported BS beam and a corresponding signal strength of the BS beam as measured by the UE.

26. The method of claim 24, wherein the information relating to the one or more BS beams is based on at least one of a service type, a quality of service, or a mobility state of the UE.

27. The method of claim 1, wherein:
the RACH procedure comprises a contention-based RACH procedure; and
the request to report the information relating to the plurality of BS beams does not identify the plurality of BS beams.

28. The method of claim 27, further comprising deciding which beam group of the plurality of beam groups to report in the second message based on signal strengths measurements associated with the plurality of beam groups.

* * * * *